UNITED STATES PATENT OFFICE.

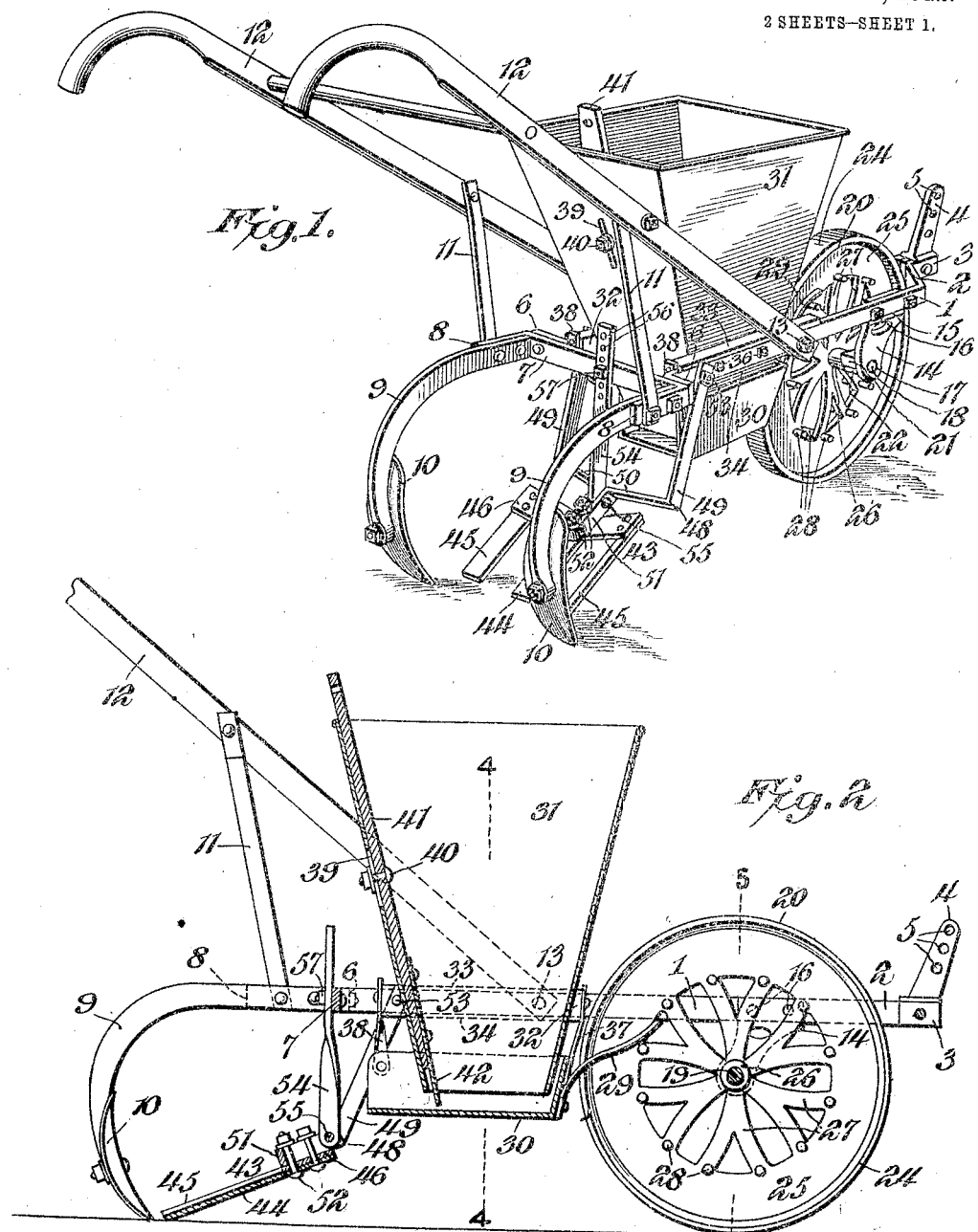

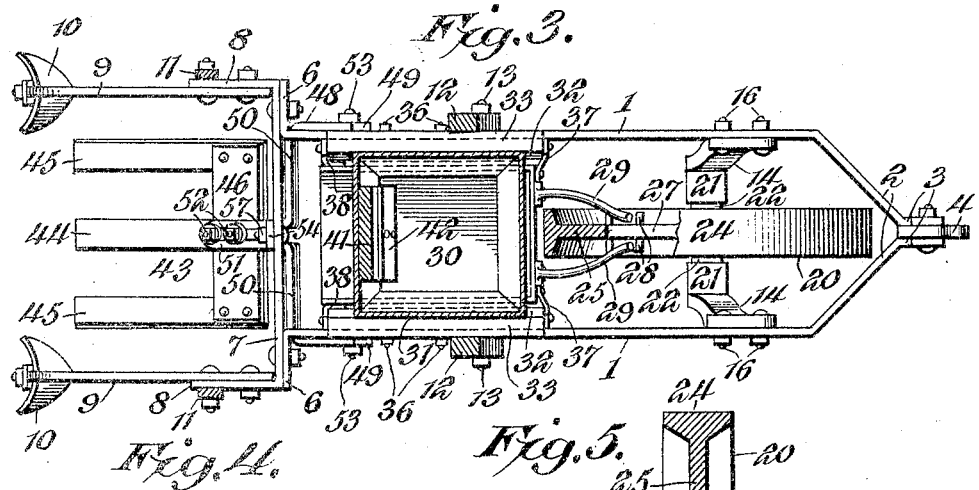
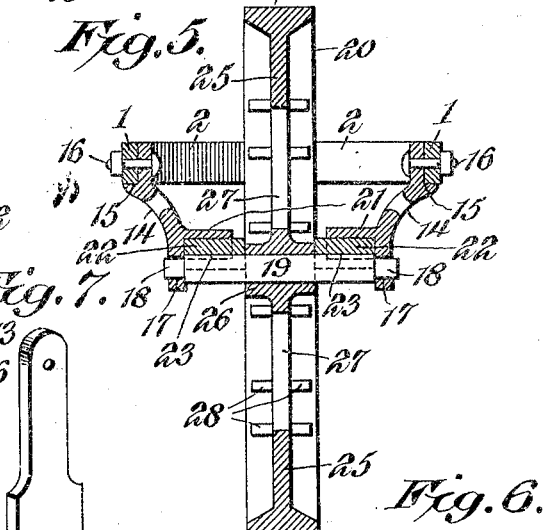
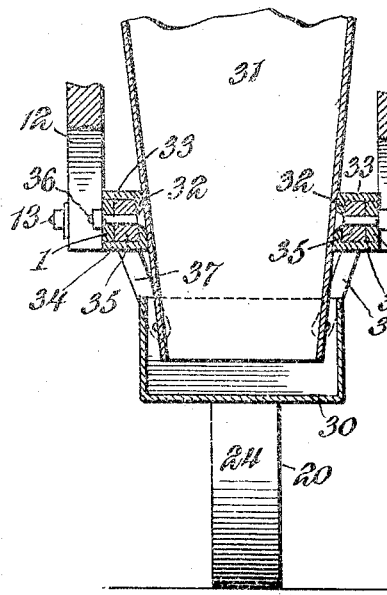
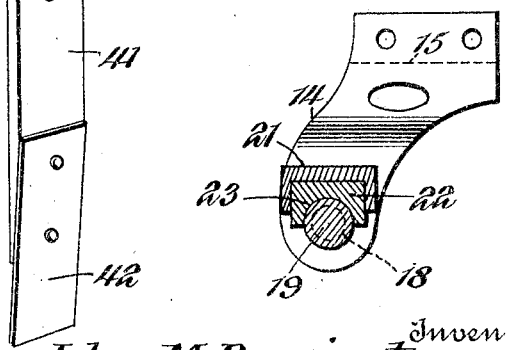

JOHN M. BRASINGTON, OF BENNETTSVILLE, SOUTH CAROLINA, ASSIGNOR, BY MESNE ASSIGNMENTS, TO T. E. & C. S. McCALL CO., OF BENNETTSVILLE, SOUTH CAROLINA.

FERTILIZER-DISTRIBUTER.

1,014,044.

Specification of Letters Patent.

Patented Jan. 9, 1912.

Application filed July 2, 1910. Serial No. 570,172.

*To all whom it may concern:*

Be it known that I, JOHN M. BRASINGTON, a citizen of the United States, residing at Bennettsville, in the county of Marlboro and State of South Carolina, have invented a new and useful Fertilizer-Distributer, of which the following is a specification.

The invention relates to improvements in fertilizer distributers.

The object of the present invention is to improve the construction of fertilizer distributers, and to increase their efficiency and to lessen the labor incident to fertilizing land.

Another object of the invention is to prevent cotton stalks and roots and other trash from clogging the tappet wheel and interfering with the operation of the mechanism for vibrating the shoe.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a fertilizer distributer, constructed in accordance with this invention. Fig. 2 is a central longitudinal sectional view of the same. Fig. 3 is a plan view, the hopper being in section. Fig. 4 is a transverse sectional view on the line 4—4 of Fig. 2. Fig. 5 is a similar view on the line 5—5 of Fig. 2. Fig. 6 is a detail sectional view of one of the hangers, illustrating the construction of the bearings for the axle of the tappet wheel. Fig. 7 is a detail perspective view of the adjustable feed regulating slide. Fig. 8 is a similar view of one of the wooden bearing blocks.

Like numerals of reference designate corresponding parts in all the figures of the drawings.

In the embodiment of the invention illustrated in the accompanying drawings, the frame of the fertilizer distributer comprises in its construction spaced parallel side bars or beams 1, provided with converging front portions 2 having angularly bent front terminals 3, between which is bolted an upwardly projecting clevis 4, arranged at an inclination and provided at intervals with perforations 5 for the attachment of a draft device. The rear terminals 6 of the side bars or beams are bent at right angles and extend outward laterally of the frame and are connected by a rear transverse bar 7, extending beyond the parallel portions of the said side bars or beams 1, and bolted to the laterally extending rear terminals 6 thereof. The transverse connecting bar 7 has its terminals 8 bent at right angles and extended rearwardly to form attaching arms, to which are secured the upper ends of standards 9 of a pair of covering blades or shovels 10. The rearwardly extending terminal portions or arms 8 also support braces 11, secured at their lower ends to the arms 8 and extending upwardly to and secured to the inner faces of a pair of handle bars 12. The handle bars 12, which are inclined, are secured by bolts 13, or other suitable fastening means to the side bars or beams of the frame.

Depending from the side bars of the frame at the front portions of the same are opposite hangers 14, provided at their tops with recesses 15 to receive the side bars 1 and fit against the inner faces and lower edges of the same, and secured to the said side bars by bolts 16. The hangers are curved downwardly and inwardly and are provided at their lower ends with bearing openings 17 for the reception of reduced terminals 18 of an axle 19 of a tappet wheel 20. The reduction of the terminals of the axle to provide the journals or gudgeons forms shoulders, which fit against the hangers at the inner faces thereof. The hangers are also provided at their lower portions with approximately inverted U-shaped casings 21, consisting of horizontal top portions and depending sides and forming recesses for the reception of removable wooden spacing and bearing blocks 22. The bearing blocks 22 are rectangular in cross section to fit in the recesses of the casings 21, and they extend from the hangers to the tappet wheel and space the latter from the casings and are provided in their lower faces with bearing recesses 23 for the reception of opposite intermediate portions of the axle. The bearing blocks fit tightly against the axle and form dust proof bearings for the same, as the blocks are adapted to scrape any accumulation from the intermediate bearing portions of the axle.

The tappet wheel, which has a broad tread or periphery 24, is provided with a solid annular web or rim 25, forming the outer portion of the wheel and connected with the hub 26 by relatively short spokes 27, preferably formed integral with the rim and arranged in pairs. The members of each pair of spokes are united at their inner portions and have diverging outer portions, and the wheel is equipped at the outer portions of the spokes with laterally projecting tappets 28, arranged to engage forwardly extending arms 29 of a shaking shoe 30, located beneath the open end of a hopper 31. The arms 29, which are fixed at their rear ends to the shaking shoe, extend forwardly and upwardly from the same, and their front portions are located in the paths of the opposite tappets.

The hopper 31, which is tapered downwardly, is removably seated on the frame, being supported by metallic members 32, consisting of upper and lower horizontal flanges 33 and 34 and an inclined connecting web or portion, fitted against the inclined side of the hopper, as clearly shown in Fig. 4 of the drawings. The horizontal top and bottom flanges extend outwardly over and under the upper and lower edges of the side bars 1, and wooden filler bars 35 are arranged within the supporting members and are interposed between the connecting webs and the inner faces of the side bars, and are secured to the supporting members and to the side bars by horizontal bolts 36. The inner side faces of the filler bars are inclined to conform to the inclination of the connecting webs or sides of the supporting members, and the heads of the bolts 36 are countersunk in the latter. The extended outer portions of the horizontal flanges 33 and 34 by being engaged with the upper and lower edges of the side bars 1 of the frame throw the weight of the hopper upon the side bars and relieve the bolts of the strain incident to the weight of the hopper and its contents. The tapering shape of the hopper tends to force the supporting members and the filler bars outwardly and to maintain the former in engagement with the side bars of the frame. The hopper may be lifted off the frame of the machine when it is desired to remove it therefrom.

The shoe, which is substantially rectangular, consists of a bottom, sides and a connecting front wall, and it is open at its rear end for the discharge of the fertilizer. It is suspended from the frame by flexible straps 37 and 38, connected at their lower ends with the shoe at the front and back thereof and secured at the upper terminals to the ends of the filler bars by suitable fastening devices.

The rear wall of the hopper is inclined and is provided with a slot 39, through which passes a bolt 40 for adjustably securing a feed regulating slide 41 to the inner face of the rear wall of the hopper. The bolt is provided with a nut, but any other suitable means may be employed for securing the slide in its adjustment. The lower end of the slide is equipped with a metallic plate 42, having a projecting lower cutting edge, located above the bottom of the shaking shoe and adapted when the shoe is vibrated to chop or cut the fertilizer, whereby the latter is effectually prevented from accumulating on the slide and interfering with the proper feed of the device.

When the fertilizer distributer is drawn forward, the fertilizer is discharged at the rear end of the shoe. In order to obviate the necessity of plowing the ground to mix and distribute the fertilizer properly after the same has been deposited by the fertilizer distributer, the latter is equipped with a combined mixing and spreading device 43, adapted to spread the fertilizer, pulverize the soil and mix the fertilizer with the soil before the fertilizer is covered by the blades or shovels 10. The combined spreading and mixing device, which is set at an inclination, consists of a central blade 44 and side blades 45, connected at their upper ends by a transverse plate or piece 46 to which the blades are riveted, or otherwise secured. The transverse plate or piece is bent at the center to form inclined angularly related side portions, as clearly shown in Fig. 1 of the drawings, and the side blades or members 45 are set at an inclination. Instead, however, of employing the spaced inclined central and side blades, a continuous sheet or piece of metal, or other suitable material having inclined side portions or wings may be provided. As this is obvious, illustration thereof is deemed unnecessary. The blades, however, are deemed more effective in mixing the fertilizer with the soil.

The inclined spreading and mixing device is hung from the rear portion of the frame of the fertilizer distributer by a hanger 48, which is in the form of a yoke. The yoke is composed of spaced sides 49, lower inwardly extending transverse arms or portions 50, and a rearwardly extending loop 51. The hanger 48 is preferably constructed of a single piece of bar metal, or other suitable material bent into the form described, and the combined spreading and mixing device is secured to the hanger by bolts 52, arranged in the loop 51. The upper ends of the sides of the yoke are pivoted by bolts 53 to the side bars of the frame of the fertilizer distributer, and the loop 51 is connected with the transverse bar 7 by an adjusting bar 54, pivoted at its lower end in the loop 51 by a bolt 55, or other suitable fastening device and provided at its upper portion with a series of perforations 56, arranged at intervals and adapted to receive a bolt 57, which also pierces the transverse connecting bar 7 at the center thereof. By adjusting the bar 54, the combined spreading and mixing device may be arranged to run at the desired depth to secure the proper spreading of the fertilizer and the mixing of the same with the soil.

No claim is made in this application to the combined spreading and mixing device.

Having thus fully described my invention, what I claim as new and desire to secure by Letters Patent, is:—

1. A fertilizer distributer including a frame composed of side bars having spaced parallel portions connected at their front ends and having laterally extending rear terminals, and a rear transverse connecting bar extending beyond the parallel portions of the side bars and secured to the laterally extending rear terminals thereof and having its ends extended rearwardly to form projecting attaching arms, means mounted on the frame for distributing the fertilizer, and covering blades having standards secured to the said rearwardly extending arms.

2. A fertilizer distributer including a frame composed of side bars having spaced parallel portions connected at their front ends and having laterally extending rear terminals, and a rear transverse connecting bar extending beyond the parallel portions of the side bars and secured to the laterally extending rear terminals thereof and having its ends extended rearwardly to form projecting attaching arms, means mounted on the frame for distributing the fertilizer, covering blades having standards secured to the said rearwardly extending arms, inclined handle bars secured at their lower ends to the sides of the frame, and braces supporting the handle bars and connected at their lower ends to the rearwardly extending arms of the frame.

3. A fertilizer distributer including a frame having spaced side bars, opposite hangers secured at their upper ends to the side bars and depending from the same and provided at their lower ends with bearing openings, said hangers being also provided above the bearing openings with casings extending from the inner faces of the hangers, a wheel having an axle journaled in the bearing openings of the hangers, and spacing blocks arranged in the casings and provided at their lower faces with bearing recesses to receive the axle and extending across the space between the hangers and the wheel and spacing the latter from the side bars and the hangers.

4. A fertilizer distributer including a frame having spaced side bars, hangers secured at their upper ends to the side bars and depending therefrom and provided with bearing openings and having inwardly extending approximately inverted U-shaped casings located above the bearing openings, a wheel having an axle arranged in the bearing openings of the hangers, and spacing blocks fitted in the said casings and extending across the space between the hangers and the wheel and spacing the latter from the side bars and the hangers.

5. A fertilizer distributer including a frame having opposite side bars, supporting members arranged at the inner faces of the side bars of the frame and extending longitudinally thereof and provided with upper and lower outwardly projecting flanges extending over the upper edges of the side bars and beneath the lower edges of the same, filler bars arranged within the supporting members, fastening means for securing the supporting members and the filler bars to the sides of the frame, and a hopper fitted between and supported by the said members.

6. A fertilizer distributer including a frame having opposite side bars, supporting members arranged at the inner faces of the side bars of the frame and extending longitudinally thereof and provided with upper and lower outwardly projecting flanges extending over the upper edges of the side bars and beneath the lower edges of the same, filler bars arranged within the supporting members, fastening means for securing the supporting members and the filler bars to the sides of the frame, and a tapered hopper fitting between the supporting members, the latter being provided with inclined faces to fit the taper of the hopper.

7. A fertilizer distributer including a frame having opposite side bars, supporting members extending longitudinally of the side bars at the inner faces thereof and consisting of inclined side portions, and upper and lower outwardly projecting flanges extending over the upper edges of the side bars and beneath the lower edges of the same, filler bars arranged within the supporting members and interposed between the same and the side bars of the frame, means for securing the supporting members and the filler bars to the frame, and a tapered hopper removably fitted between the supporting members and carried by the same.

8. A fertilizer distributer including a frame having opposite side bars, supporting members extending longitudinally of the side bars at the inner faces thereof and consisting of inclined side portions, and upper and lower outwardly projecting flanges extending over the upper edges of the side bars and beneath the lower edges of the same, filler bars arranged within the supporting members and interposed between the same and the side bars of the frame, means for securing the supporting members and the filler bars to the frame, a tapered hopper removably fitted between the supporting members and carried by the same, a shaking shoe located beneath the hopper and provided with suspending means secured to the ends of the filler bars, and means for vibrating the shoe.

In testimony, that I claim the foregoing as my own, I have hereto affixed my signature in the presence of two witnesses.

JOHN M. BRASINGTON.

Witnesses:
JOHN H. SIGGERS,
DAVID R. WAGNER.